United States Patent [19]

Jaye

[11] Patent Number: 4,491,520
[45] Date of Patent: Jan. 1, 1985

[54] FILTER FOR WATER JUGS

[76] Inventor: Richard C. Jaye, 12 Brian Ct., Watertown, Wis. 53094

[21] Appl. No.: 612,895

[22] Filed: Feb. 22, 1984

[51] Int. Cl.³ ............................................. B01D 27/08
[52] U.S. Cl. .................................. 210/232; 210/244; 210/282; 210/482; 222/189
[58] Field of Search ............... 210/232, 237, 238, 282, 210/464, 465, 484, 244, 419, 482; 222/185, 189

[56] References Cited

U.S. PATENT DOCUMENTS

| | | | |
|---|---|---|---|
| 1,625,442 | 4/1927 | Wiggenhorn | 210/282 |
| 2,280,480 | 4/1942 | Cox | 210/282 |
| 2,477,998 | 8/1949 | McCowan | 222/189 |
| 3,184,064 | 5/1965 | Sampson | 210/282 |
| 3,392,837 | 7/1968 | Sanzenbacher | 210/282 |
| 3,879,292 | 4/1975 | McClive | 210/232 |
| 4,045,350 | 8/1977 | Kupf | 210/232 |
| 4,072,615 | 2/1978 | McConnell | 210/282 |
| 4,181,243 | 1/1980 | Frahm | 222/189 |

FOREIGN PATENT DOCUMENTS 879868  8/1971  Canada ................................. 210/282

Primary Examiner—Ernest G. Therkorn
Attorney, Agent, or Firm—James E. Nilles; James R. Custin

[57] ABSTRACT

A filter for a conventional water jug having a valved tap near the bottom of its cylindrical side wall comprises a pan-like case member that seats in the bottom of the jug and has a filter cartridge removably sealed across its open top. An aperture in the axially short cylindrical side wall of the case member communicates its interior with the inwardly projecting tubular tap inlet. A radially projecting tubular collar on the case member cooperates with an O-ring to provide a seal between the interior of the case member and the tap inlet. A tacky, water-insoluble adhesive area on the underside of the bottom wall of the case member secures it to the bottom wall of a jug. The filter cartridge can comprise blow molded shell halves, filter paper discs, and activated charcoal confined between the discs.

6 Claims, 4 Drawing Figures

FILTER FOR WATER JUGS

FIELD OF THE INVENTION

This invention relates to a filter for water jugs, capable of being quickly and easily installed in an existing water jug of a popular thermally insulated type that has a top fill opening which is normally closed by a removable cover and has a valved outlet tap at its bottom; and the invention relates more particularly to a filter which can be readily installed in the bottom portion of such a jug to filter the contents of the jug in the course of its flow to the outlet tap.

BACKGROUND OF THE PRIOR ART

A type of water jug that is widely used has a substantially cylindrical side wall, a substantially flat bottom wall, and a valved outlet tap or faucet through the side wall, at a level just above the bottom wall, through which the contents of the jug can be drawn off as required. Such jugs are frequently used by travelers, who must fill the jug from whatever water supply is available. Since the jug often provides the only source of drinking water that is readily accessible, the purity of the water dispensed from it is a matter of great importance. If the source from which the jug is filled is suspected of being contaminated with disease germs, a germicidal preparation can be added to the water, but this does not solve the problem of removing sand, silt, rust, scale and other filterable foreign matter that may be present in it to impair its palatability.

It is obvious, therefore, that the provision of a suitable filter in a water jug of the character described would be useful and desirable. In fact, it has been found that there is a strong demand for such a filter in certain areas where pure, clean drinking water is relatively scarce.

A filter unit satisfactory for installation in a jug of the character described must meet several requirements.

The filter must obviously be effective, and this means that it should incorporate activated charcoal pellets or granules for removal of gases that impart taste and odor to water. However, a water jug is often subjected to shaking and jostling that tends to break up charcoal, and therefore the charcoal should be enclosed in filter paper or the like that will prevent small particles of it from passing out with the dispensed water.

The filter paper picks up sand, silt and the like that may be present in the water, but it is rather fragile and must be adequately protected from being punctured by ice cubes dropped into the jug.

The filter must be so arranged that all water flowing to the tap or faucet at the bottom of the jug is constrained to pass through it. Hence there must be a seal between the filter and some part of the jug, whereby unfiltered water is prevented from flowing to the tap inlet. To further complicate the problem, the jug normally has a smooth interior surface, but the inside diameter of its cylindrical side wall is not necessarily maintained within close tolerances, so that a sealing connection of a filter to the jug side wall is impractical. Of course the connection between the jug and the filter must be a secure and sturdy one, capable of supporting the jostling, bumping and tilting to which the jug may be subjected; but the filter must nevertheless be readily removable from the jug for cleaning or replacement.

From a functional standpoint, the filter should be able to remove all filterable solids from the water, and therefore it must necessarily present substantial resistance to flow of water through it. In view of this, the filter should have a relatively large effective surface area, so that even though flow of water through any one small unit of its surface area is relatively slow, the total flow of filtered water through is at a satisfactorily fast rate. With a large surface area, there is also the advantage that a large volume of turbid water can be put through the filter before it needs cleaning or replacement.

A further important requirement is that the filter be as compact as possible, because the water volume capacity of the jug is necessarily reduced by the volume of the filter. Furthermore, the filter should be so arranged that it traps no more than a negligible quantity of water in a part of the jug where it cannot pass through the filter and into the outlet tap.

While meeting all of these requirements, the filter unit must nevertheless be as inexpensive as possible.

Heretofore no filter unit has been available that meets the several objectives set forth above. Perhaps the nearest approach to a device that might serve the purpose is disclosed by U.S. Pat. No. 4,181,243, to Frahm, which discloses a filter cartridge for a water cooler of the type having an open-top reservoir on which a large water bottle is supported in inverted position. A tap or faucet at the bottom of the reservoir has a screw-threaded tubular inlet stem which extends through the side wall of the reservoir and is secured by a nut at the inside of that wall. A cup-shaped holder into which a filter cartridge is push-fitted has a coaxial threaded hole in its end wall whereby it is screwed onto the inwardly projecting end portion of the faucet stem. The filter cartridge is relatively small, and it would have to be even smaller if it were adapted to a water jug, wherein the outlet tap is located as near as possible to the bottom wall, since the radius of the cup-shaped holder would have to be a little smaller than the small distance from the center of the tubular faucet stem to the bottom wall. Even in the water cooler installation in which it is shown, the filter cartridge of the Frahm patent necessarily has a relatively small surface area; in a water jug installation it would have an unsatisfactorily small filtering capacity and would choke the outflow of water to a slow trickle.

U.S. Pat. No. 2,477,998 to McCowan discloses a dispenser wherein bar soap is dissolved in water to be dispensed as a liquid. The soap rests on a screen which could be regarded as a type of filter and which extends across the entire interior of the container, a little above its bottom, supported on the top of a wide funnel that leads down to a valved outlet duct in the bottom of the container. In the disclosed device it is of no consequence that a certain amount of water can bypass the screen by flowing around its edge, but a true filter arranged in the same manner as that screen would have to be sealed to the side wall of the container. In this and other obvious respects the arrangement suggested by McCowan would be unsatisfactory for a filter for an existing water jug of the character described.

U.S. Pat. No. 3,392,837 to Sanzenbacher discloses a water container of rather complicated configuration that has its outlet specially formed to accommodate a filter cartridge. The disclosed arrangement is obviously unsuitable for existing water jugs, and especially those of the thermally insulated type.

SUMMARY OF THE INVENTION

The general object of the present invention is to provide a very inexpensive but nonetheless highly effective filter unit which can be very readily installed in an existing water jug of the thermally insulated type, is securely retained in the jug notwithstanding the most severe jostling and jolting that the jug is likely to withstand, and is so arranged in the jug that all water flowing to the outlet tap at the bottom of the jug must pass through the filter unit and only an insignificant quantity of unfiltered water is trapped in the jug.

Another object of this invention is to provide a filter unit of the character described that comprises both filter paper and granular activated charcoal, to provide for both filtration and adsorption of gases that impart unpleasant taste and odor to water, which unit has a large effective surface area to permit a high rate of throughput of filtered water but nevertheless occupies a relatively small volume so that it does not materially reduce the useful capacity of the jug in which it is installed.

It is also an object of this invention to provide a filter unit of the character described that is securely fastened into a thermally insulated water jug by the simple act of putting it in place at the bottom of the jug, and which, when installed, has a sealing connection with the conventional outlet tap at the bottom of the jug to prevent unfiltered water from flowing to that tap.

BRIEF DESCRIPTION OF DRAWINGS

In the accompanying drawings, which depict what are now regarded as preferred embodiments of the invention.

DETAILED DESCRIPTION OF PREFERRED EMBODIMENT OF THE INVENTION

Figure 1:
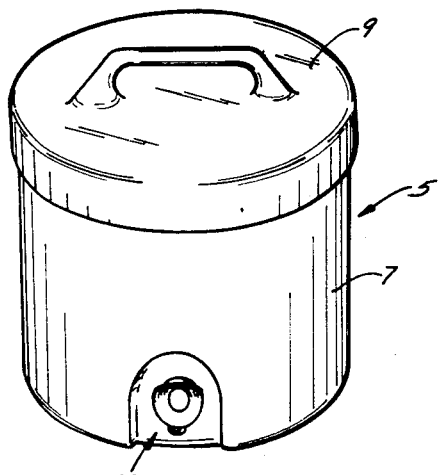
FIG. 1 is a perspective view of a typical water jug in which a filter unit of this invention can be installed.

A water jug 5 in which a filter unit 6 of this invention is suitable for installation generally has an upright side wall 7, a substantially flat bottom wall 8 and an open top that is normally closed by a screw-threaded cover cap 9. The side wall 7 is usually cylindrical, but the invention is suitable for jugs that have square or other non-circular cross-sections as viewed from above. Typically a water jug has rather thick side and bottom walls of a thermally insulating material, and the inner surfaces of those walls are made as smooth as possible in the interests of sanitation.

Such a jug has a small push-button faucet or valved tap 10 at its bottom through which its contents can be drawn off into a cup or the like. The faucet has a tubular stem or inlet portion 11 which extends through the side wall 7 of the jug, a little above the bottom wall 8, and which has an external thread on its inner end portion to receive a nut 12 whereby the faucet is secured to the jug side wall. Confined between the nut 12 and the inner surface of the side wall 7 are a rigid washer 14 and a resilient annular gasket 15 that cooperate with the nut to seal the faucet to the side wall 7. The washer 14, which lies adjacent to the nut 12, is of larger diameter than the nut and thus defines an annular shoulder that faces into the interior of the jug and beyond which the threaded inner end portion of the faucet stem 11 projects inward relative to the jug.

The filter unit 6 of this invention comprises, in general, a pan-like case member 17 and a filter cartridge 18 that is readily removably installed in the case member.

The case member 17, which can be blow-molded of a suitable plastic material, has a substantially flat bottom case wall 20 and a low side case wall 21 that projects up from the bottom case wall. The side case wall 21 is preferably cylindrical, but the case member can be square or rectangular in planform, especially if it is intended for a jug of non-circular cross-section, although even in that case it can be cylindrical. Preferably the side case wall 21 has at its upper edge a radially outwardly projecting flange 22 that extends completely around it and lies in a single plane, for supporting the filter cartridge 18 and forming a seal to it as explained hereinafter. The outside diameter of the case member 17 is such that it is receivable within the interior of the jug with a small clearance (on the order of ½ inch to 1 inch) from its side wall 7.

At one location in the axially short side case wall 21 there is an aperture 23 through it, and a short tubular collar 24 is sealed to the side case wall all around that aperture and in radially outwardly projecting relationship to the main part of the case member. The collar 24 can be molded in one piece with the rest of the case member or, as here shown, the collar 24 can comprise a short length of plastic tubing and the case member can be provided with an outwardly projecting attachment flange 25 around the aperture 23, over which the tubular collar piece is telescoped and to which it is heat sealed or otherwise bonded. The collar 24 has an inside diameter such that it can fit around the nut 12 on the outlet tap stem with its outer end sealingly opposing the shoulder defined by the washer 14. Preferably an O-ring 26 is interposed between that shoulder and the outer end of the collar 24 to provide a seal between them.

To hold the case member 17 in the bottom portion of the jug with its collar in sealing relation to the washer 14, there is an area 27 of a tacky, water-insoluble adhesive material on the underside of the bottom case wall 20, in a portion thereof that is spaced from the collar 24, and preferably diametrically opposite the collar. To provide such an adhesive area, it has been found very satisfactory to employ a tape that has an adhesive coating on both of its surfaces, such as that sold under the trademark Fastmount. As is conventional, the adhesive area can be protected by a peel-off film until the cartridge unit is to be installed in a water jug.

As will be readily apparent, installation of the case member 17 into a water jug is effected by slipping the O-ring 26 over the nut 12, bringing the case member into the interior of the jug and sliding its collar 24 around the nut 12, and then, while maintaining some force against the base member in the direction to hold the collar 24 in compressive engagement with the O-ring 26, bringing the bottom of the case member into contact with the bottom wall 8 of the jug for securement to it by means of the adhesive area 27. Once installed, the case member remains very securely in place, but of course it can be removed at any time by pulling it up with enough force to overcome the tenacity of the adhesive.

Figure 2:
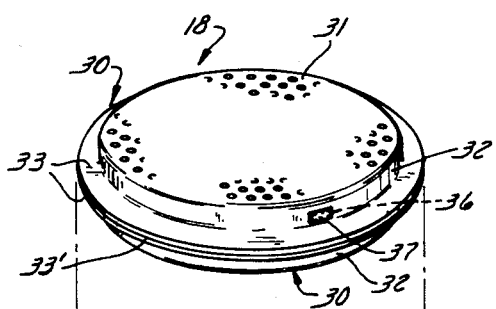
FIG. 2 is a disassembled perspective view of the filter unit of this invention.
Figure 3:
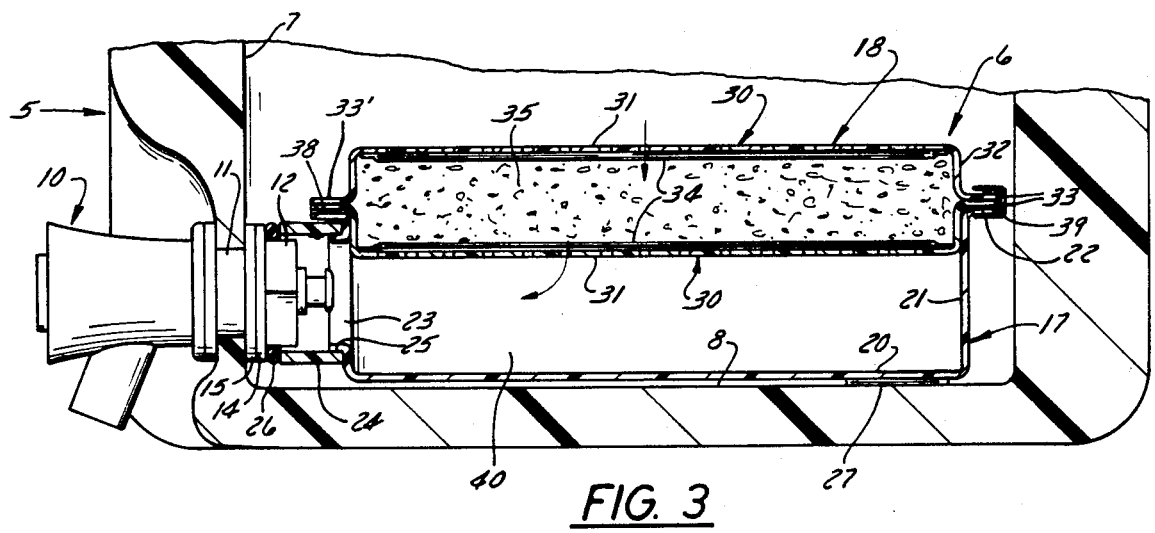
FIG. 3 is a view in vertical section through the bottom portion of a water jug and a filter unit of this invention installed therein.

The filter cartridge 18 extends across the open top of the case member 17 and is sealed to it so that water can enter the case member, for flow to the tap 10 through the case member aperture 23, only by passing downward through the filter cartridge. As shown in FIGS. 2 and 3, the filter cartridge comprises two identical shell elements 30, each of which is shaped like a shallow bowl and which can be readily blow-molded of plastic. Each shell element 30 has a substantially flat foraminous end wall 31 and an imperforate, axially short, cylindrical side wall 32 which projects axially in one direction from the end wall 31. It will be understood that if the side wall 21 of the case member 17 is other than cylindrical, the side wall 32 of each shell element will have a corresponding shape, to fit closely within the side wall of the case member. Around its rim the shell element side wall 32 has a radially outwardly projecting flange element 33. The two shell elements 30 have their flange elements 33 secured in flatwise opposing relationship to one another, as by heat sealing them. The assembled shell elements 30 thus form an axially shallow drum-shaped enclosure having a flange 33' around its middle that is defined by the superimposed flange elements 33.

Before the shell elements 30 are bonded to one another, a disc 34 of filter paper is placed in each, to overlie the inner surface of its end wall. Each disc 34 must be large enough in diameter to have its marginal edge portion surround the apertured area of the foraminous end wall 31 of its shell element, and this marginal edge portion of the disc, around its entire periphery, is heat sealed or otherwise bonded to an imperforate portion of the shell.

Preferably the interior of the cartridge, between the filter paper discs, is filled with pellets or granules of activated charcoal 35. Granules of a known bactericidal resinous material can be mixed with the charcoal or used in place of it. For inserting the charcoal and/or resin, a hole 36 is made in the side wall 32 of one of the shell elements through which the material is filled into the cartridge; and after filling, the hole 36 is sealed over, as by means of a patch-like piece of film 37 that is bonded to the shell member as by heat sealing.

The diameter or width of the filter cartridge 18 is such that it can be closely received within the side case wall 21 with its flange 33' flatwise overlying the flange 22 on the case member. Preferably an annular gasket 38 is interposed between those two flanges 22 and 33', and they are maintained in compressive sealing engagement with the gasket 38 by means of small clamp clips 39, which also serve to hold the cartridge 18 in place in the case member 17. Obviously, the cartridge 18 can be readily removed from the case member, for cleaning or replacement, without the need for removing the case member from the jug. Installation of the filter cartridge 18 in the case member 17 is greatly facilitated by the fact that the filter cartridge is all-ways symmetrical, so that there is no wrong way to insert it.

The axial dimensions of the filter cartridge 18 and of the case member 17 are such that with the cartridge installed in the case member the bottom of the cartridge is spaced a substantial distance above the bottom case wall 20, thus defining in the lower portion of the case member a chamber 40 that holds a substantial supply of filtered water which is immediately available for flow out of the tap 10, even though water may pass down through the filter cartridge at a slightly slower rate than it is drawn off. Ordinarily, however, the large surface area of the filter cartridge ensures a satisfactorily high volume flow rate through it, notwithstanding a substantial pressure drop across it that is inevitable with thorough filtration. It will be apparent that the only unfiltered water that will be trapped in the jug is that which occupies the narrow annular space in the bottom of the jug that surrounds the filter unit.

The filter paper discs 34 not only prevent small charcoal particles from passing out of the jug in the filtered water but also perform thorough filtration in themselves, especially since the water is required to pass through the two of them successively. It will be apparent that the filter paper discs are well protected by the foraminous end walls 31 of the cartridge shell, the holes in which can be small enough (e.g., ⅛ inch to 3/16 inch) to ensure that the discs will not be punctured by ice cubes or other sharp objects that might find their way into the jug.

Figure 4:
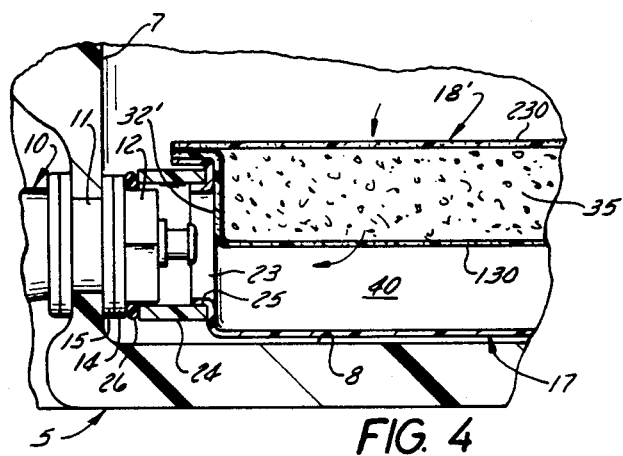
FIG. 4 is a fragmentary view, generally similar to FIG. 3 but showing a modified embodiment of the invention.

In the embodiment of the invention illustrated in FIG. 4, the case member 17 can be as described above, but the filter cartridge 18' is formed of two pieces of a commercially available porous polyethylene sheet material. One of those pieces is formed (as by spinning) to a bowl-shaped shell element 130 that is generally similar to the shell elements 30 of the previously described embodiment of the invention; the other piece is a simple disc 230. The charcoal and/or resin granules 35 can be filled into the bowl-shaped shell element 130 before the disc-shaped element 230 is sealed to it. The pores of the sheet material are small enough so that it can serve as a filter medium that has the same filtering efficiency as filter paper, and therefore no filter paper is needed in this embodiment of the invention. To prevent water flowing through the filter cartridge from by-passing the granular medium 35 in its interior, the side wall 32' of the bowl-shaped shell element 130 is coated with cement or the like that seals its pores.

The axial height of the bowl-shaped shell element 130 is such that it projects a substantial distance downward into the case member 17 but is, again, spaced above its bottom to provide a chamber 40 through which water that has passed through the filter cartridge 18' can flow to the tap 10.

From the foregoing description taken with the accompanying drawings it will be apparent that this invention provides a compact, inexpensive but highly effective filter for conventional water jugs, capable of being installed in a very few seconds without requiring any modification of the jug structure and permitting water to be drawn from the jug at a fast rate of flow notwithstanding thorough filtration of it.

What is claimed as the invention is:

1. A filter unit for installation in a water jug of the type having a side wall, a substantially flat bottom wall, a top opening through which the jug can be filled and which can be closed by a cover, and a valved outlet tap extending through said side wall at a level near said bottom wall, said tap defining an inwardly facing annular shoulder at the interior of said side wall and having an axially short tubular inlet portion that is concentrically surrounded by said shoulder and projects beyond the same into the interior of the jug, said filter unit comprising:

A. a pan-like case member having
  (1) a substantially flat bottom case wall adapted to overlie said bottom wall of the jug,
  (2) a side case wall projecting up from said bottom case wall, said side case wall (a) having a top rim extending therearound that lies in a single plane and (b) having an aperture therethrough at one side of said case member, and (3) a tubular collar portion projecting radially outwardly from the side case wall and sealed thereto around said aperture, said collar portion having a diameter to surround said tubular inlet portion of the tap and to have its outer end sealed to said shoulder;

B. tacky, water-insoluble adhesive means on the bottom of said bottom case wall, spaced from said one side of the case member, whereby the case member is secureable to the bottom wall of a jug; and C. an axially short filter cartridge of a width to be closely receivable within said side case wall and having opposite top and bottom end surfaces through which water to be filtered can flow successively, said filter cartridge having a radially outwardly projecting circumferential flange extending therearound which is spaced above its bottom end surface and which sealingly engages said top rim all around the same and supports the cartridge with its bottom end surface spaced above said bottom case wall.

2. The filter unit of claim 1 wherein said filter cartridge comprises:

(1) a pair of identical shallow, substantially cup-shaped shell elements, each having (a) a foraminous end wall, (b) an imperforate side wall portion connected to said end wall and projecting axially in one direction therefrom, and (c) a flange portion around said side wall portion, projecting radially outwardly therefrom at the end thereof that is remote from said end wall, said shell elements having their flange portions opposingly bonded to one another to cooperate in defining said flange; and (2) a filler of filter material confined between said end walls and surrounded by said side wall portions.

3. The filter unit of claim 2 wherein said filler of the filter cartridge comprises:

(1) a disc of filter paper inwardly adjacent to each of said end walls, having its edge adjacent to the side wall portion which is connected to that end wall, the marginal portions of said discs being sealed to the shell elements all around the same, and (2) a quantity of activated charcoal pellets confined between said discs.

4. The filter unit of claim 1 wherein said filter cartridge comprises:

(1) a disc element of porous but substantially rigid material;

(2) a shallow, substantially bowl-shaped shell element having (a) a porous end wall, (b) a water-impervious side wall portion connected to said end wall and projecting axially in one direction therefrom, and (c) a flange portion around said side wall portion, projecting radially outwardly therefrom at the end thereof that is remote from said end wall and to which the marginal edge portion of said disc element is sealed to define said flange; and (3) a filter body of granular material confined between said disc element and said porous end wall and surrounded by said side wall portion.

5. A filter unit for installation in a water jug of the type having a side wall, a substantially flat bottom wall, a top opening through which the jug can be filled and which can be closed by a cover, and a valved outlet tap extending through said side wall at a level near said bottom wall, said tap defining an inwardly facing annular shoulder at the interior of said side wall and having an axially short tubular inlet portion that is concentrically surrounded by said shoulder and projects beyond the same into the interior of the jug, said filter unit comprising:

A. a pan-like case member having (1) a substantially flat bottom case wall adapted to overlie said bottom wall of a jug, (2) a side case wall projecting up from said bottom case wall and which has an aperture therethrough at one side thereof but which is otherwise imperforate, and (3) a tubular collar portion projecting radially outwardly from the side case wall and sealed thereto around said aperture, said collar portion having a diameter to surround said tubular inlet portion and to have its outer end sealed to said shoulder;

B. a filter element sealed across the top of said side case wall in upwardly spaced relation to said bottom case wall and through which water permeates downwardly to flow to said outlet tap through said aperture; and C. tacky, water-insoluble adhesive means on the underside of said bottom case wall, spaced from said one side of said side case wall, whereby the case member is securable to the bottom wall of a jug.

6. A filter unit for installation in a water jug of the type having a side wall, a top opening through which the jug can be filled and which can be closed by a cover, and a valved outlet tap extending through said side wall at a level near said bottom wall, said tap having an axially short tubular inlet portion that projects into the interior of the jug, said filter unit being characterized by:

A. an axially short case member (1) having a bottom case wall which is substantially flat, to overlie said bottom wall of a jug, (2) having a side case wall which projects upward from said bottom wall a distance to have a top edge spaced above the level of said tap, and (3) having an aperture in said side case wall through which said inlet portion of said tap is communicable with the interior of said case member;

B. a filter sealed across said top edge of said side case wall and through which water must permeate downward to flow to said aperture;

C. means for providing a seal between said side wall of the jug, surrounding said inlet portion of said tap, and said side case wall, surrounding said aperture, whereby water that has permeated through said filter is guided to said inlet portion and unfiltered water is excluded therefrom; and D. tacky, water-insoluble adhesive means on the underside of said bottom case wall for securing the case member to the bottom wall of a jug.

* * * * *